June 29, 1937.  A. R. SPICACCI  2,085,456

MOUNTING FOR LATHE CENTERS AND THE LIKE

Filed March 3, 1936

INVENTOR:
ATTILIO R. SPICACCI,
BY Gales P. Moore
HIS ATTORNEY.

Patented June 29, 1937

2,085,456

UNITED STATES PATENT OFFICE 2,085,456

MOUNTING FOR LATHE CENTERS AND THE LIKE

Attilio R. Spicacci, Bristol, Conn., assignor to General Motors Corporation, Detroit, Mich., a corporation of Delaware Application March 3, 1936, Serial No. 66,872

13 Claims. (Cl. 82—31)

This invention relates to mountings for lathe centers and the like and comprises all of the features of novelty herein disclosed. An object of the invention is to provide an improved bearing mounting. Another object is to provide a bearing mounting for lathe centers and the like in which the bearings are protected from overload, as by expansion of the work. Another object is to provide a mounting to yieldingly resist a thrust load on a shaft and to exert substantially the same resistance throughout a substantial degree of shifting movement of the shaft. Another object is to provide an arrangement of spring washers adapted to divide a thrust load and applicable more especially to tail stocks to yieldingly resist shifting movement of a lathe center.

To these ends and also to improve generally upon devices of this character, the invention consists in the various matters hereinafter described and claimed. In its broader aspects, the invention is not necessarily limited to the specific construction selected for illustrative purposes in the accompanying drawing in which Fig. 1 is a sectional view taken axially of a tail stock.

Figure 1:
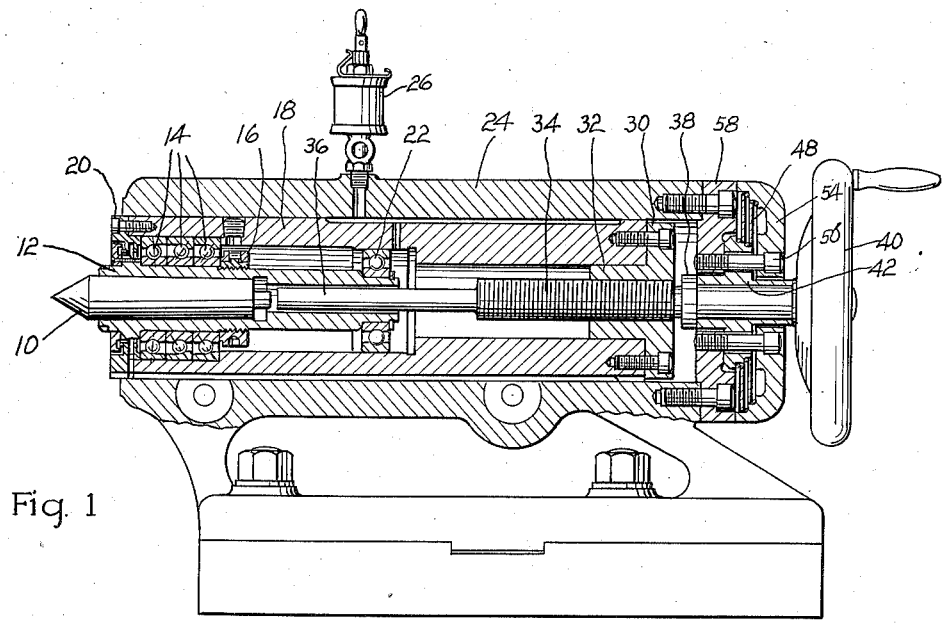
Figure 2:
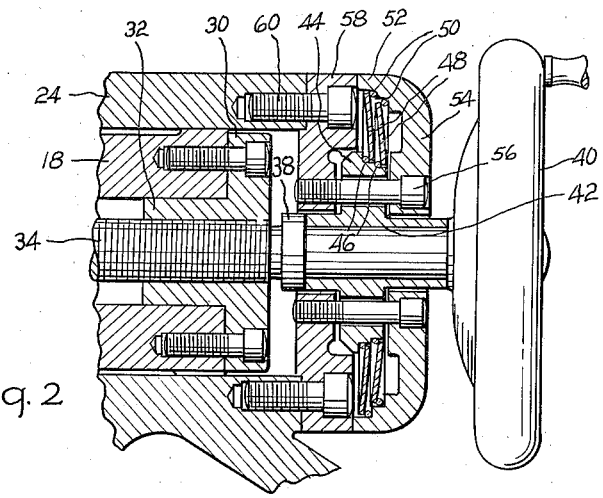

Fig. 2 is an enlarged sectional view of a portion of Fig. 1 showing the parts in a different position.

The numeral 10 indicates a lathe center whose tapered shank is held in a tapered hole of a sleeve 12. Antifriction bearings 14 have their inner race rings clamped on the sleeve by a nut 16 while the outer race rings are clamped in a sleeve 18 by a cap 20. The two inner bearings have a high contact angle and are preferably mounted in tandem to divide the thrust load while the outer or third bearing has a low contact angle to furnish a rigid radial support close to the lathe center point while also serving to preload the other two and to prevent forward movement of the sleeve 12 when the lathe center is being knocked out. Another antifriction bearing 22 is interposed between the sleeves 12 and 18 and can float in the latter. The cap 20 provides a labyrinth seal in co-operation with a ring secured to the sleeve 12. The sleeve 18 is slidably mounted in a quill or housing 24, lubricant being supplied from an oil cup 26 to the sleeve and to the bearings.

A flange 30 on a nut 32 is secured to one end of the sleeve 18 by screws, the nut projecting into the sleeve and engaging the threads of an adjusting screw shaft 34 whose end portion 36 is reduced in diameter and extended into the sleeve 12 to a point adjacent to the lathe center. The screw shaft carries a thrust collar 38 and a hand wheel 40. Between the collar and the hand wheel is a non-rotatable sleeve 42 having an outwardly projecting flange 44. This flange is stepped or shouldered to receive rings 46 each bearing laterally against the inner portion of a spring washer 48 of the Belleville type. Each washer 48 is preferably made of spring steel and bears laterally at its outer portion against a ring 50. The rings 50 are carried on internal steps or shoulders of a flange 52 on an outer end cap 54. The rings 46 and 50 are preferably of round cross section to avoid digging into the washers when the latter become flexed. The cap is anchored in position by headed screws 56 passing freely through holes in the flange 44 and threaded in an inner cap 58 which is fastened to the quill 24 by screws 60. The screws 56 key the sleeve 42 against rotation but permit its shifting endwise. The spring washers are mounted in parallel and hence divide the load and their deflection characteristics are such that they afford approximately the same resistance to flexing throughout a substantial degree of flexing. Without limiting the invention, it may be stated that by making the larger washer of six inches outside diameter, 3.42 inches bore and .105 thick, the smaller washer of 5.6 inches outside diameter, 3.20 inches bore and .095 thick, when the thrust load reaches 1500 pounds, an axial deflection of the lathe center and shaft of as much as one tenth of an inch will occur with less than 50 pounds variation in the thrust load. This will take care of expansion of the work and protect the bearings from overload.

In use, the lathe center is urged against the work with the desired initial pressure by turning the hand wheel 40 which moves the slidable sleeve 18 to the left in Fig. 1 together with all the parts carried by it. The reaction is transferred from the collar 38 to the sleeve 42 and its flange 44 and thence to the spring washers 48 which become somewhat flexed. When the lathe center is subsequently forced farther to the right, as by expansion of the work due to heating, the spring washers will flex an additional amount as indicated in Fig. 2, but, because of the selected deflection characteristics of these washers, little or no further increase occurs in the load on the bearings. That is, the initial axial load on the lathe center and bearings is resisted by the spring washers and they continue to resist approximately the same amount in spite of the actual shifting of the lathe center and bearings towards them. This action is to be distinguished from that of coil springs which exert a rapidly increasing resistance as they are compressed and such springs require a longer space. The parallel mounting of the spring washers enables them to divide the load, and the provision of the recessed outer cap with its inner portion anchored by bolts extending through the flange 44 of the shiftable sleeve 42 provides a neat and compact assembly of no larger diameter than that of the quill or housing. This avoids any lateral projections beyond the original outline of the quill or housing, yet provides a mounting for spring washers of ample proportions to resist a heavy load.

I claim:

1. In a device of the character indicated, a shaft adapted to receive thrust load, a housing, a member anchored to the housing and having abutments, a sleeve on the shaft and shiftable endwise therewith, the sleeve having abutments facing the housing abutments, independent spring washers interposed between the sleeve abutments and the other abutments and being mounted in parallel and out of contact with one another to divide the thrust load; substantially as described.

2. In a device of the character indicated, a shaft adapted to receive a varying thrust load and to be shifted endwise thereby, a housing, a member anchored to the housing and having abutments, a sleeve on the shaft and receiving the thrust, the sleeve having abutments facing the housing abutments, independent spring washers interposed between the sleeve abutments and the other abutments, the spring washers with their respective abutments being independent of one another whereby each washer is subject to only a portion of said thrust load and the washers having deflection characteristics to provide substantially the same yielding resistance to shifting movement of the shaft under said varying thrust load; substantially as described.

3. In a device of the character indicated, a shaft, a housing, a sleeve slidable in the housing and having threaded connection with the shaft, a work-engaging member carried by the sleeve, a member anchored to the housing and having an annular abutment, a sleeve on the shaft and shiftable endwise therewith, the sleeve having an annular abutment, and a spring washer interposed between the abutments; substantially as described.

4. In a device of the character indicated, a shaft adapted to receive thrust load, a housing, a member anchored to the housing and having an abutment, an abutment shiftable endwise with the shaft, and a spring washer interposed between the abutments; substantially as described.

5. In a device of the character indicated, a shaft, a housing, a member anchored to the housing and having stepped internal shoulders to provide abutments, a sleeve on the shaft and shiftable endwise therewith, the sleeve having stepped external shoulders to provide abutments, and spring washers mounted in parallel between corresponding abutments; substantially as described.

6. In a device of the character indicated, a shaft, a housing, a member anchored to the housing and having stepped internal shoulders to provide abutments, a sleeve on the shaft and shiftable endwise therewith, the sleeve having stepped external shoulders to provide abutments, rings having a rounded contour engaging the abutments, and spring washers engaging the corresponding rings; substantially as described.

7. In a device of the character indicated, a shaft adapted to receive thrust load, a housing, a member anchored to the housing and having an abutment, a sleeve on the shaft and shiftable endwise therewith, the sleeve having an abutment, means for holding the sleeve from rotation, a spring washer interposed between the abutments, and means for rotating the shaft; substantially as described.

8. In a device of the character indicated, a shaft adapted to receive thrust load, a housing, a housing cap having an abutment, a sleeve on the shaft and having an abutment, a spring washer between the abutments, fastening devices for anchoring the cap to the housing and for holding the sleeve from rotation, and means for rotating the shaft; substantially as described.

9. In a device of the character indicated, a shaft adapted to receive thrust load, a housing, a housing cap having an abutment, a sleeve on the shaft and shiftable endwise therewith, a flange on the sleeve and having an abutment, a spring washer between the abutments, screws for securing the cap to the housing and passing through the flange, and means for rotating the shaft; substantially as described.

10. In a device of the character indicated, a lathe center, a shaft adapted to shift endwise, an antifriction bearing to receive thrust load from the lathe center, means to transmit the load from the bearing to the shaft, and means to yieldingly resist movement of the shaft, said means being constructed and arranged to exert substantially the same yielding resistance to the movement of the shaft throughout a substantial degree of shifting movement to avoid overload on the bearing; substantially as described.

11. In a device of the character indicated, a member adapted to receive a thrust load, a shaft adapted to shift endwise with said member, an antifriction bearing to transfer the thrust load from the member to the shaft, and means to yieldingly resist movement of the shaft, said means being constructed and arranged to exert substantially the same yielding resistance to the movement of the shaft throughout a substantial degree of shifting movement; substantially as described.

12. In a device of the character indicated, a member adapted to receive a thrust load, a shaft adapted to shift endwise with said member, an antifriction bearing to transfer the thrust load from the member to the shaft, and means to yieldingly resist movement of the shaft, said means comprising a spring washer having deflection characteristics which limit the thrust load on the bearings; substantially as described.

13. In a device of the character indicated, a member adapted to receive a thrust load, a housing, a sleeve slidable in the housing, an antifriction bearing to transmit the thrust load from the member to the sleeve, a rotatable shaft having threaded connection with the sleeve, an abutment carried by the shaft, an abutment anchored to the housing, and a spring washer interposed between the abutments; substantially as described.

ATTILIO R. SPICACCI.